United States Patent
Modavis (10) Patent No.: US 9,638,863 B2
(45) Date of Patent: May 2, 2017

(54) FURCATING OPTICAL COUPLING DEVICES AND FURCATION SYSTEMS INCORPORATING THE SAME

(71) Applicant: Corning Incorporated, Corning, NY (US)

(72) Inventor: Robert Adam Modavis, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/908,325

(22) PCT Filed: Jul. 22, 2014

(86) PCT No.: PCT/US2014/047564
§ 371 (c)(1),
(2) Date: Jan. 28, 2016

(87) PCT Pub. No.: WO2015/017183
PCT Pub. Date: Feb. 5, 2015

(65) Prior Publication Data
US 2016/0170149 A1    Jun. 16, 2016

Related U.S. Application Data

(60) Provisional application No. 61/860,027, filed on Jul. 30, 2013.

(51) Int. Cl.
*G02B 6/32* (2006.01)
*G02B 6/28* (2006.01)
(Continued)

(52) U.S. Cl.
CPC .............. *G02B 6/32* (2013.01); *G02B 3/04* (2013.01); *G02B 5/001* (2013.01);
(Continued)

(58) Field of Classification Search
CPC .... G02B 6/02; G02B 6/02042; G02B 6/2848; G02B 6/32; G02B 6/3616; G02B 3/04;
(Continued)

(56) References Cited

U.S. PATENT DOCUMENTS 5,793,912 A   8/1998   Boord et al.
6,160,943 A   12/2000  Davis et al.
(Continued)

OTHER PUBLICATIONS

United States Patent and Trademark Office; International Search Report; Mail Date: Nov. 21, 2014; pp. 1-2.
(Continued)

*Primary Examiner* — Andrew Jordan (57) ABSTRACT

An optical coupling device includes a multi-core fiber alignment station, a single-mode fiber alignment station, and a furcation lens assembly. The multi-core fiber alignment station and single-mode fiber alignment station include alignment hardware configured to position optical fibers at fixed positions relative to an optical axis of the furcation lens assembly. The furcation lens assembly includes a furcating and projecting axicon surfaces that are rotationally invariant and are configured such that optical modes of an optical fiber aligned in one of the fiber alignment stations are spatially separated and substantially telecentrically mapped to corresponding optical modes of optical fibers aligned in the other fiber alignment station.

23 Claims, 4 Drawing Sheets

(51) Int. Cl.
    G02B 3/04      (2006.01)
    G02B 5/00      (2006.01)
    G02B 6/02      (2006.01)
    G02B 6/36      (2006.01)

(52) U.S. Cl.
    CPC ....... G02B 6/02042 (2013.01); G02B 6/2808 (2013.01); G02B 6/2848 (2013.01); G02B 6/3616 (2013.01)

(58) Field of Classification Search
    CPC . G02B 5/00; G02B 5/001; G02B 6/28; G02B 6/2808; G02B 6/36
    See application file for complete search history.

(56) References Cited

U.S. PATENT DOCUMENTS

| | | |
|---|---|---|
| 6,360,041 B1 | 3/2002 | Nakama et al. |
| 9,091,835 B2* | 7/2015 | Cunningham ....... G02B 6/4471 |
| 2004/0061954 A1 | 4/2004 | Ludington et al. |
| 2004/0086221 A1 | 5/2004 | Qiu et al. |
| 2004/0247011 A1 | 12/2004 | Okazaki et al. |
| 2009/0028502 A1 | 1/2009 | Presley et al. |
| 2010/0046884 A1 | 2/2010 | Presley et al. |
| 2011/0274435 A1 | 11/2011 | Fini et al. |
| 2014/0161402 A1* | 6/2014 | Cunningham ....... G02B 6/4471 385/100 |
| 2016/0170149 A1* | 6/2016 | Modavis .............. G02B 6/2848 385/24 |

OTHER PUBLICATIONS

Optoscribe, Ltd.; http://www.optoscribe.com; Optofan-3D; Copyright Optoscribe 2012-2016; Date accessed: Jan. 28, 2016.

Sakaguchi et al.; "19-core fiber transmission of 19x100x172-Gb/s SDM-WDM-PDM-QPSK signals at 305Tb/s"; OFC/NFOEC Postdeadline Papers (copyright 2012); pp. 1-3.

Zhu et al.; "Space-, Wavelength-, Polarization-Division Multiplexed Transmission of 56-Tb/s over a 76.8-km Seven-Core Fiber"; NFOEC Postdeadline Papers, Optical Society of America (copyright 2011); pp. 1-3.

* cited by examiner

FURCATING OPTICAL COUPLING DEVICES AND FURCATION SYSTEMS INCORPORATING THE SAME

CROSS-REFERENCE TO RELATED APPLICATIONS

This application claims the benefit of priority under 35 U.S.C. §119 of U.S. Provisional Application Ser. No. 61/860,027 filed on Jul. 30, 2013, the content of which is relied upon and incorporated herein by reference in its entirety.

BACKGROUND

The disclosure relates generally to optical devices and more particularly to furcating optical coupling devices for use in optical applications including, but not limited to, spatial division multiplexing (SDM) systems.

SUMMARY

The present disclosure is directed to furcating optical coupling devices and furcation systems incorporating the same. According to one embodiment of the disclosure, an optical coupling device comprising a multi-core fiber alignment station, a single-mode fiber alignment station, and a furcation lens assembly is provided. The multi-core fiber alignment station includes multi-core fiber alignment hardware configured to position a multi-core optical fiber at a fixed position relative to an optical axis of the furcation lens assembly. The single-mode fiber alignment station includes single-mode fiber alignment hardware configured to position single-mode optical fibers at fixed positions relative to the optical axis of the furcation lens assembly. The furcation lens assembly includes a magnifying aspheric surface, a demagnifying aspheric surface, a furcating axicon surface, and a projecting axicon surface. The aspheric and axicon surfaces of the furcation lens assembly are positioned along the optical axis such that the magnifying aspheric surface is positioned between the multi-core fiber alignment station and the furcating axicon surface, and the furcating axicon surface is positioned between the magnifying aspheric surface and the projecting axicon surface. The projecting axicon surface is positioned between the furcating axicon surface and the demagnifying aspheric surface, and the demagnifying aspheric surface is positioned between the projecting axicon surface and the single-mode fiber alignment station. The furcating axicon surface comprises at least one furcation slope component configured to spatially separate, relative to the optical axis of the furcation lens assembly, optical modes of a multi-core optical fiber aligned in the multi-core fiber alignment station. The projecting axicon surface comprises at least one telecentric slope component configured to ensure that optical modes of a multi-core optical fiber aligned in the multi-core fiber alignment station are substantially telecentric when focused at respective input faces of single-mode optical fibers aligned in the single-mode fiber alignment station. The furcating and projecting axicon surfaces are rotationally invariant relative to the optical axis of the furcation lens assembly. The aspheric and axicon surfaces of the furcation lens assembly are configured such that optical modes of a multi-core optical fiber aligned in the multi-core fiber alignment station are spatially separated and substantially telecentrically mapped to corresponding optical modes of furcated single-mode optical fibers aligned in the single-mode fiber alignment station.

An additional embodiment of the disclosure relates to an optical coupling system including an optical coupling device, a multi-core optical fiber, and a plurality of single-mode optical fibers. The multi-core optical fiber is positioned in the multi-core fiber alignment station at a fixed position relative to an optical axis of the furcation lens assembly. The plurality of single-mode optical fibers are positioned in the single-mode fiber alignment station at fixed positions relative to the optical axis of the furcation lens assembly. A furcating axicon surface of the furcation lens assembly includes at least one furcation slope component that is configured to spatially separate, relative to the optical axis of the furcation lens assembly, optical modes of the multi-core optical fiber aligned in the multi-core fiber alignment station. A projecting axicon surface of the furcation lens assembly includes at least one telecentric slope component that is configured to ensure that the optical modes of the multi-core optical fiber aligned in the multi-core fiber alignment station are substantially telecentric when focused at respective input faces of the single-mode optical fibers aligned in the single-mode fiber alignment station. The furcation lens assembly is configured such that the optical modes of the multi-core optical fiber aligned in the multi-core fiber alignment station are spatially separated and substantially telecentrically mapped to corresponding optical modes of furcated single-mode optical fibers aligned in the single-mode fiber alignment station.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description merely present examples of some contemplated embodiments of the present disclosure, and are merely intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
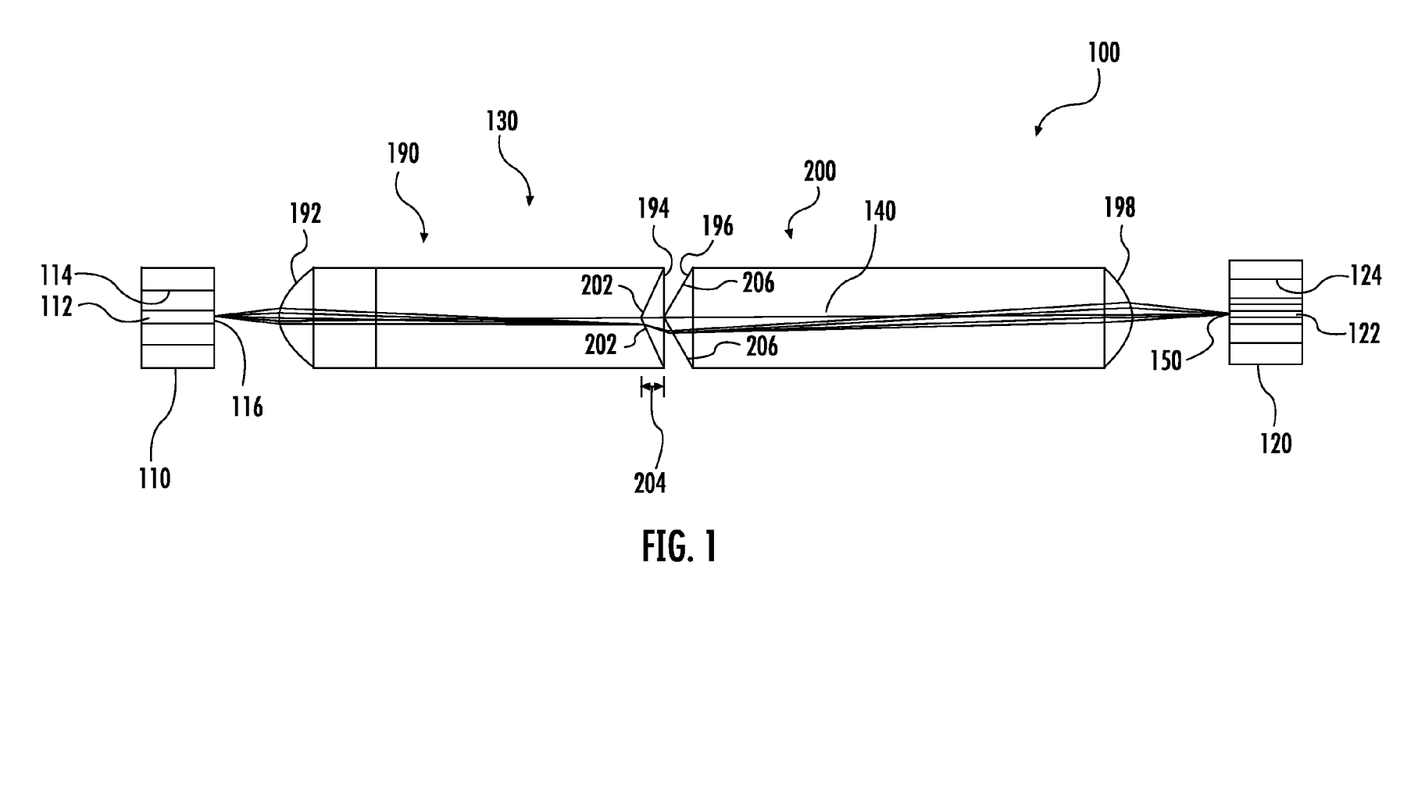
FIG. 1 is a schematic view of one embodiment of an optical coupling system as described herein.

Referring now to FIG. 1, an optical coupling system 100 includes a multi-core fiber alignment station 110, a single-mode fiber alignment station 120, and a furcation lens assembly 130. The optical coupling system 100 further includes a multi-core optical fiber 112 positioned in the multi-core fiber alignment station 110 and a single-mode optical fiber 122 positioned in the single-mode fiber alignment station 120. The multi-core fiber alignment station 110 comprises multi-core fiber alignment hardware 114 configured to position the multi-core optical fiber 112 at a fixed position relative to an optical axis 140 of the furcation lens assembly 130. The single-mode fiber alignment station 120 comprises single-mode fiber alignment hardware 124 configured to position single-mode optical fibers 122 at fixed positions relative to the optical axis 140 of the furcation lens assembly 130. The multi-core fiber alignment station 110 and single-mode fiber alignment station 120 may comprise any alignment hardware configured to fix the position of the multi-core optical fiber 112 or single-mode optical fiber 122 relative to the optical axis 140, such as optical fiber connectors, including, for example, FC connectors, SC connectors, LC connectors, ST connectors, SP connectors, and the like. The optical coupling system 100 is configured to spatially separate and substantially telecentrically map optical modes of the multi-core optical fiber 112 to corresponding optical modes of the single-more optical fiber 122, such that the optical power emitted from each fiber core of the multi-core optical fiber 112 is coupled to the corresponding fiber cores of the single-mode optical fiber 122, as discussed herein.

Figure 2:
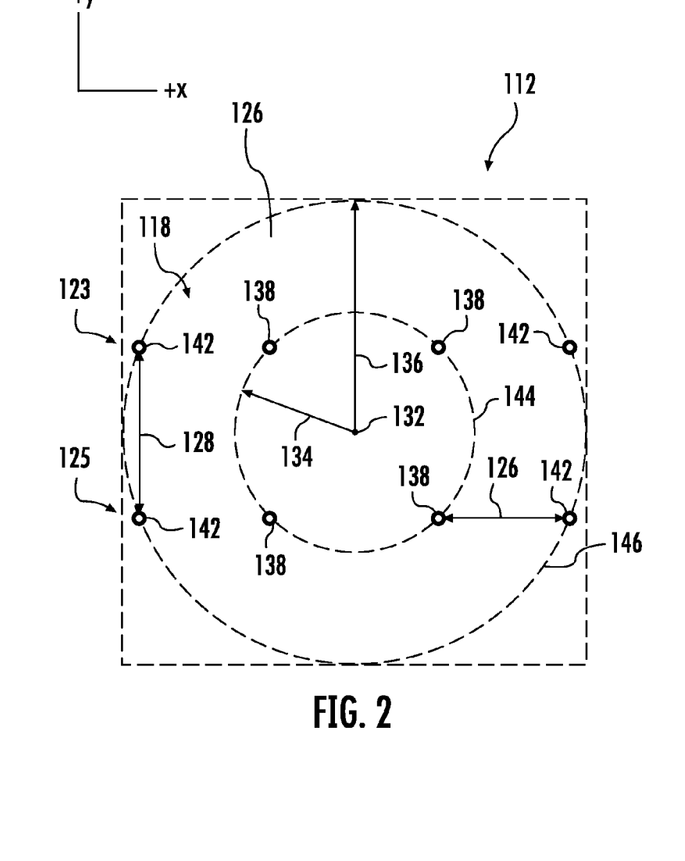
FIG. 2 is a schematic view of one embodiment of an output face of a multi-core optical fiber as described herein.

Referring briefly to FIG. 2, one embodiment of an output face 116 of the multi-core optical fiber 112 is illustrated in front view. The multi-core optical fiber 112 includes fiber cores 118 positioned on the output face 116. When coupled to a light source (not shown) the fiber cores 118 may emit an optical mode. The fiber cores 118 may be formed, for example, from glass or plastic, and may have a core diameter of about 10 μm. In other embodiments, the fiber cores 118 may be formed from alternative materials or may have different core diameters, such as 8 μm or 6 μm. Additionally, each of the fiber cores 118 on the output face 116 may have a different diameter. As shown in FIG. 2, the fiber cores 118 may be positioned in a rectangular core formation. In other embodiments, the fiber cores 118 may be in another core formation, such as a hexagonal core formation, a triangular core formation, a linear core formation, and the like. Although eight fiber cores 118 are shown in FIG. 1, the multi-core optical fiber 112 may include additional or fewer fiber cores.

In the illustrated embodiment, four of the fiber cores 118 are positioned in a first row 123 and four of the fiber cores 118 are positioned a second row 125. Each of the fiber cores 118 is spatially separated from adjacent fiber cores 118 in the x-direction by a distance 126. In some embodiments, the distance 126 may be, for example, 47 μm. In other embodiments, the distance 126 may be more or less than 47 μm. Fiber cores 118 positioned in the first row 123 are spatially separated from fiber cores 118 in the second row 125 in the y-direction by a distance 128. In some embodiments, the distance 128 may be, for example, 94 μm. In other embodiments, the distance 128 separating fiber cores 118 in the first row 123 from fiber cores 118 in the second row 125 may be more or less than 94 μm.

The fiber cores 118 are spatially separated from a longitudinal axis 132 (illustrated as a point) of the multi-core optical fiber 112 by radial distances $r_1$ 134 and $r_2$ 136. In some embodiments, the longitudinal axis 132 may be positioned at the center of the multi-core optical fiber 112, as shown in FIG. 2, and in other embodiments, the longitudinal axis 132 may be positioned at another location on the output face 116 of the multi-core optical fiber 112. Depending on the core formation of the multi-core optical fiber 112, the fiber cores 118 may have several radial distances. For example, in FIG. 2, individual fiber cores 138 are separated from the longitudinal axis 132 by radial distance $r_1$ 134, while individual fiber cores 142 are separated from the longitudinal axis 132 by radial distance $r_2$ 136. For ease in illustration, circle 144 with radius $r_1$ 134 is depicted intersecting individual fiber cores 138, and circle 146 with radius $r_2$ 136 is depicted intersecting individual fiber cores 142. In the illustrated embodiment, two radial distances $r_1$ 134 and $r_2$ 136 are sufficient to intersect with each set of the individual fiber cores 138, 142. In other embodiments, more or less radial distances may be needed to intersect with each of the fiber cores of the multi-core optical fiber 112.

Figure 3:
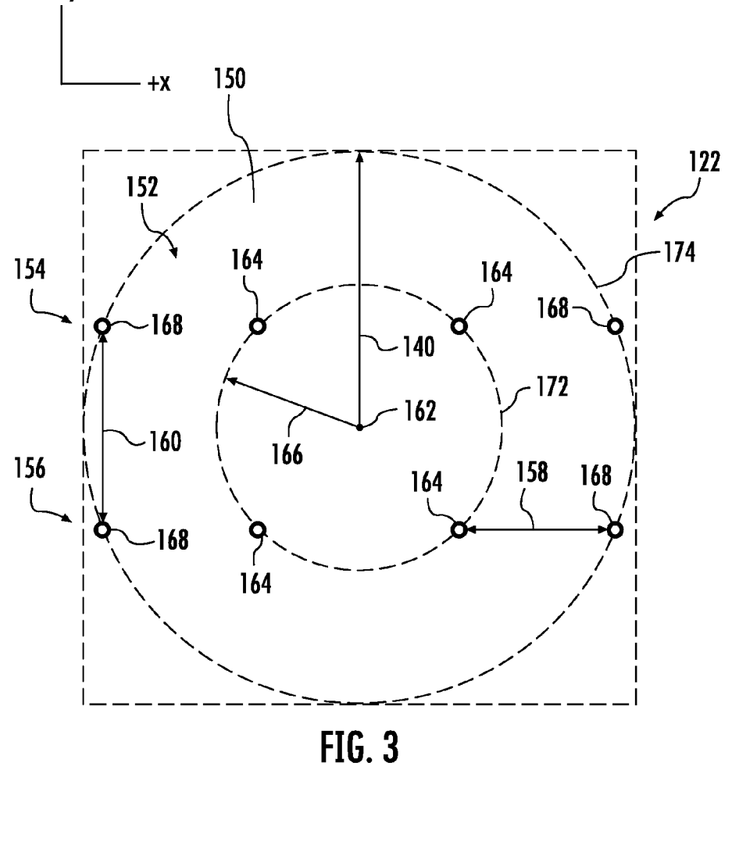
FIG. 3 is a schematic view of one embodiment of an input face of a single-mode optical fiber as described herein.

Referring now to FIG. 3, an input face 150 of the single-mode optical fiber 122 is depicted in front view. The single-mode optical fiber 122 includes fiber cores 152 positioned on the input face 150 of the individual single-mode optical fibers 122. Like the multi-core optical fiber 112, the single-mode optical fiber 122 in this embodiment includes fiber cores 152 in a rectangular formation, with four fiber cores 152 positioned in a top row 154 and four fiber cores 152 positioned in a bottom row 156. The fiber cores 152 are spatially separated in the x-direction by a distance 158, and in the y-direction by a distance 160. The fiber cores 152 are further separated from a longitudinal axis 162 (shown as a point) of the single-mode optical fiber 122 by a radial distance. In some instances, the longitudinal axis 162 may be common to the longitudinal axis 132 of the multi-core optical fiber 112. Individual fiber cores 164 are spatially separated from the longitudinal axis 162 by a radial distance $r_1$ 166, while fiber cores 168 are spatially separated from the longitudinal axis 162 by a radial distance $r_2$ 170. Circles 172, 174 are illustrated to show the radial distances $r_1$ 166 and $r_2$ 170 intersecting with each of the respective individual fiber cores 164, 168 on the input face 150 of the single-mode optical fiber 122. In the illustrated embodiment, two radial distances $r_1$ 166 and $r_2$ 170 are sufficient to intersect all of the fiber cores 152, however, in other embodiments, more or fewer radial distances may be needed.

The radial distances $r_1$ 166 and $r_2$ 170 of the single-mode optical fiber 122 may be greater than the corresponding respective radial distances 134, 136 of the multi-core optical fiber 112. For example, the difference between radial distance $r_1$ 166 and $r_2$ 170 of the single-mode optical fiber 122 may be approximately 50 μm, while the difference between radial distance $r_1$ 134 and $r_2$ 136 of the multi-core optical fiber 112 may be approximately 30 μm. The change in spatial separation between the multi-core optical fiber 112 and the single-mode optical fiber 122 may influence the optical configuration of the furcation lens assembly 130, such as the configuration of a furcating slope component, a telecentric slope component, and/or a distance between axicon surfaces of the furcation lens assembly 130, as discussed herein.

Referring back to FIG. 1, one embodiment of the optical coupling system 100 is depicted. The optical coupling system 100 includes the multi-core optical fiber 112 positioned in the multi-core fiber alignment station 110, the furcation lens assembly 130, and the single-mode optical fiber 122 positioned in the single-mode fiber alignment station 120. Each component 112, 130, 122 is positioned along the optical axis 140. Optical modes propagating along the optical axis 140 from a single fiber core 118 of the output face 116 of the multi-core optical fiber 112 propagate through the furcation lens assembly 130 to a corresponding fiber core 152 on the input face 150 of one of the plurality of single-mode optical fibers 122. The output face 116 in this embodiment also forms the object plane in the optical coupling system 100, while the input face 150 forms the image plane in the optical coupling system 100.

In the illustrated embodiment, the furcation lens assembly 130 includes a first lens element 190 and a second lens element 200 positioned along the optical axis 140. The first and second lens elements 190, 200 may be movable with respect to each other in some embodiments, or may otherwise be fixed relative to each other in other embodiments. Although the illustrated embodiment includes two lens elements 190, 200, other embodiments may contain more or fewer lens elements, as discussed herein.

The first lens element 190 includes a magnifying aspheric surface 192 and a furcating axicon surface 194. The second lens element 200 includes a projecting axicon surface 196 and a demagnifying aspheric surface 198. The magnifying aspheric surface 192 may be positioned between the multi-core optical fiber 112 and the furcating axicon surface 194. The magnifying aspheric surface 192 may comprise, for example, an aspheric lens and may reduce spherical aberration and/or optical aberration of optical modes propagating through the magnifying aspheric surface 192. The magnifying aspheric surface 192 may have a symmetric profile about the optical axis 140 or, more particularly, may be rotationally invariant relative to the optical axis 140 of the furcation lens assembly 130. The magnifying aspheric surface 192 may produce a magnified image of the fiber core 118 of the multi-core optical fiber 112 near the furcating axicon surface 194.

Figure 4:
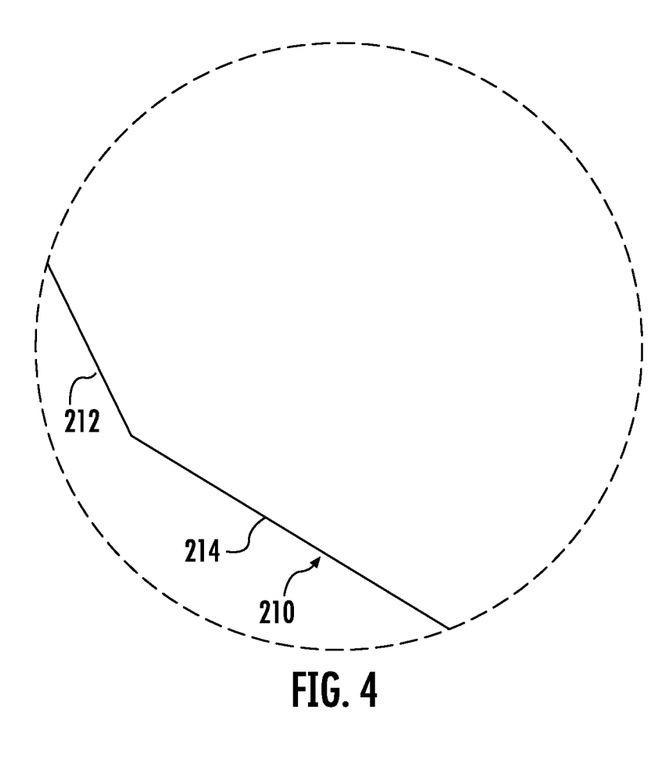
FIG. 4 is a schematic close-up view of one embodiment of a projecting axicon surface as described herein.
Figure 5:
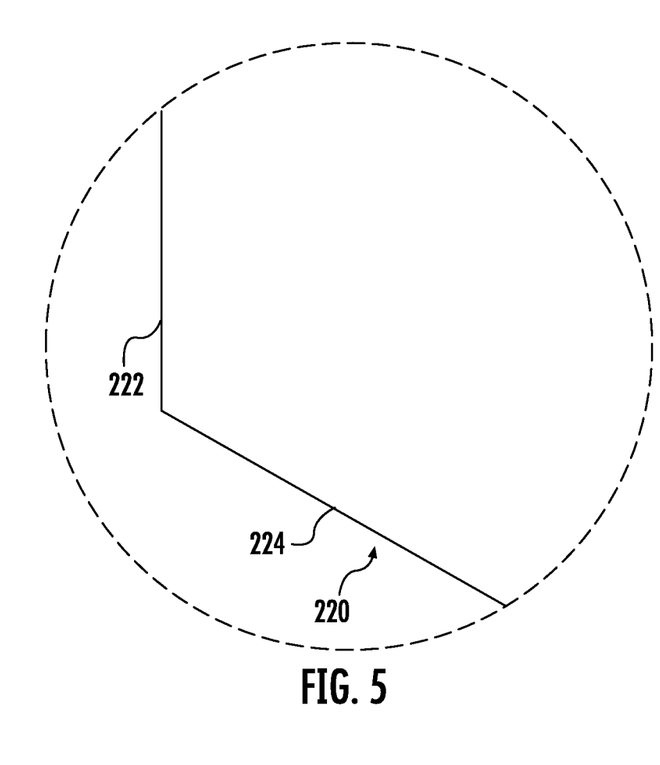
FIG. 5 is a schematic close-up view of an alternative embodiment of a projecting axicon surface as described herein.

The furcating axicon surface 194 may be positioned between the magnifying aspheric surface 192 and the projecting axicon surface 196. The furcating axicon surface 194 may comprise, for example, an axicon lens. The furcating axicon surface 194 comprises a conical surface with a furcation slope component 202. The furcating axicon surface 194 comprises at least one furcation slope component 202 configured to spatially separate, relative to the optical axis 140 of the furcation lens assembly 130, optical modes of the multi-core optical fiber 112 aligned in the multi-core fiber alignment station 110. The furcating axicon surface 194 has a consistent furcation slope component 202, making the furcating axicon surface 194 rotationally invariant relative to the optical axis 140 of the furcation lens assembly 130. Because the magnifying aspheric surface 192 and the furcating axicon surface 194 may be rotationally invariant, the first lens element 190 may not require a specific azimuthal orientation. Although the furcating axicon surface 194 is illustrated with a single furcation slope component 202, the furcating axicon surface 194 may have additional slope components or flat regions orthogonal to the optical axis 140, making the furcating axicon surface 194 a compound axicon surface, as discussed herein. FIGS. 4 and 5, described in further detail below, illustrate two examples of axicon surfaces with multiple slope components.

The furcating axicon surface 194 may be configured to separate optical modes from fiber cores 118 of the multi-core optical fiber 112 such that the individual optical modes achieve a spatial separation substantially equal to the spatial separation of the single-mode optical fibers 122. The purpose of the furcating axicon surface 194 is to separate the optical modes in such a manner as to obtain the proper spacing of the optical modes at the image plane, or output face 116 of the multi-core optical fiber 112. The spatial separation is a function of the furcation slope angles (e.g. furcation slope component 202) of the furcating axicon surface 194 and a distance 204 between the furcating axicon surface 194 to the projecting axicon surface 196, as discussed below. In some embodiments, the spatial separation of the single-mode optical fibers 122 may be wider than the spatial separation of the multi-core optical fiber 112, but in other embodiments, the spatial separation of the single-mode optical fibers 122 may be narrower than the spatial separation of the multi-core optical fiber 112. Depending on the number of radial distances needed to intersect with all of the fiber cores 118 of the multi-core optical fiber 112, the furcating axicon surface 194 may have additional furcation slope components. For example, the multi-core optical fiber 112 in FIG. 2 includes two radial distances $r_1$ 134 and $r_2$ 136, with each radial distance $r_1$ 134 and $r_2$ 136 intersecting four of the fiber cores 118. Accordingly, the furcating axicon surface 194 may have at least two furcation slope components.

The second lens element 200 includes the projecting axicon surface 196 and the demagnifying aspheric surface 198. The projecting axicon surface 196 may be positioned along the optical axis 140 in between the furcating axicon surface 194 and the demagnifying aspheric surface 198. The projecting axicon surface 196 may be positioned the distance 204 apart from the furcating axicon surface 194 and may be movable with respect to the furcating axicon surface 194 in some embodiments. The distance 204 may affect the configuration of the furcation slope components 202 and may be configured to achieve different spatial separations. The projecting axicon surface 196 may be configured to ensure optical modes propagating through the second lens element 200 focused on the single-mode optical fiber cores 152 are substantially telecentric. The projecting axicon surface 196 may comprise an axicon lens, for example, and also comprises a conical surface with a telecentric slope component 206. The telecentric slope component 206 may be constant, making the projecting axicon surface 196 rotationally invariant relative to the optical axis 140 of the furcation lens assembly 130. The telecentric slope component 206 may be equal to or different than the furcation slope component 202.

Although only a single telecentric slope component 206 is shown, additional telecentric slope components or flat surfaces may be included, depending once again on the number of radial distances of the multi-core optical fiber 112, as discussed herein. The projecting axicon surface 196 may project the optical mode propagating from the furcating axicon surface 194 to the demagnifying aspheric surface 198, and subsequently to the fiber cores 152 at the input face 150 of the single-mode optical fiber 122. The projecting axicon surface 196 may be configured such that the optical mode propagating from a fiber core 118 of the multi-core optical fiber 112 is substantially telecentrically mapped to the corresponding fiber core 152 of the single-mode optical fiber 122. By substantially telecentrically mapping the optical mode, a mode size of the optical mode may remain substantially unchanged by the projecting axicon surface 196. It is noted that "substantially" telecentric mapping allows for some degree of variation from a condition of perfect telecentric mapping, i.e., up to approximately 10%, or more preferably 5% or less, such as 1%, in terms of the degree of cross-sectional misalignment of a propagating optical mode and the optical mode of a receiving fiber.

FIGS. 4 and 5 illustrate two examples of axicon surfaces with multiple slope components. In FIG. 4, a transitional portion of a projecting axicon surface 210 is depicted with a first telecentric slope component 212 and a second telecentric slope component 214. For ease in illustration, the difference in slope between the first and second telecentric slope components 212, 214 is exaggerated. This embodiment is configured for use with a multi-core optical fiber defining optical modes disposed at two different radial distances, with one telecentric slope component configured to telecentrically project optical modes of fiber cores at an inner radial distance of the output face of the multi-core optical fiber, and the other telecentric slope component configured to telecentrically project optical modes of fiber cores at an outer radial distance of the output face of the multi-core optical fiber.

In FIG. 5, a transitional portion of a projecting axicon surface 220 includes a telecentric slope component 224 and a flat portion 222 orthogonal to an optical axis. This embodiment is configured to allow an optical mode positioned near or at a center of the output face of the multi-core optical fiber to propagate directly through the projecting axicon surface 220 without altering the optical properties such as the mode size or shape of the optical mode. For example, a multi-core optical fiber having a geometry of a hexagonal arrangement of six fiber cores surrounding a central core (not shown) may be optically coupled using a furcation lens assembly (such as furcation lens assembly 130) comprising a pair of compound furcating and projecting axicon surfaces (e.g. projecting axicon surface 220) with flat central regions for the central core and with the appropriate slope angles for the six surrounding cores. A corresponding furcating axicon surface (not shown) may also have a corresponding flat portion to allow optical modes propagating through the furcation lens assembly to propagate without interfering with the optical properties of the optical mode.

Referring back to FIG. 1, the demagnifying aspheric surface 198 may be positioned between the projecting axicon surface 196 and the single-mode optical fiber 122. The demagnifying aspheric surface 198 may comprise, for example, an aspheric lens and may reduce spherical aberration and/or optical aberration of the optical mode propagating through the furcation lens assembly 130. The demagnifying aspheric surface 198 may have a symmetric profile about the optical axis 140 or, more particularly, may be rotationally invariant relative to the optical axis 140 of the furcation lens assembly 130. The demagnifying aspheric surface 198 may be configured to demagnify the magnified image of the fiber core of the multi-core optical fiber 112 that was produced by the magnifying aspheric surface 192, such that the single-mode optical fiber core 152 receives substantially the same size mode field that was emitted by the fiber core 118 of the multi-core optical fiber 112.

Optical modes may be emitted from an individual fiber core 118 of the multi-core optical fiber 112. As an optical mode propagates through the optical coupling system 100, the optical mode may be magnified by the magnifying aspheric surface 192. The magnifying aspheric surface 192 magnifies the optical mode and may adjust the mode field size of the optical mode. The magnifying aspheric surface 192 of the first lens element 190 forms a magnified image of the multi-core optical fiber 112 near the furcating axicon surface 194 of the first lens element 190. As the optical mode propagates from the magnifying aspheric surface 192 to the furcating axicon surface 194, the furcating axicon surface 194 comprises a furcation slope component 202 that allows the furcating axicon surface 194 to separate the optical mode from other optical modes emitted from fiber cores 118 on the output face 116 of the multi-core optical fiber 112 in order to achieve a spatial separation substantially equal to the spatial separation of the single-mode optical fiber 122. As the optical mode propagates across the distance 204, if any, between the furcating axicon surface 194 and the projecting axicon surface 196, the optical mode is substantially telecentrically projected by the projecting axicon surface 196 to the demagnifying aspheric surface 198. The projecting axicon surface 196 comprises the telecentric slope component 206 that is configured to allow the projecting axicon surface 196 to substantially telecentrically map the optical mode from the fiber core 118 of the multi-core optical fiber 112 to the corresponding fiber core 152 of the single-mode optical fiber 122. As the optical mode propagates from the projecting axicon surface 196 to the demagnifying aspheric surface 198, the demagnifying aspheric surface 198 demagnifies the image of the fiber core 118 that was magnified by the magnifying aspheric surface 192 such that the single-mode optical fiber core 152 receives the same size mode field that was emitted by the fiber core 118 of the multi-core optical fiber 112. Accordingly, the optical mode is mapped from the fiber core 118 of the multi-core optical fiber 112 to the corresponding fiber core 152 of the single-mode optical fiber 122 with substantially the same mode size, mode field, and spatial separation. The optical coupling system 100 may not be unidirectional, and may also couple optical modes from the single-mode optical fiber 122 to an array of multi-core optical fiber cores 118, or can otherwise be used in reverse with optical modes propagating in the opposite direction.

Figure 6:
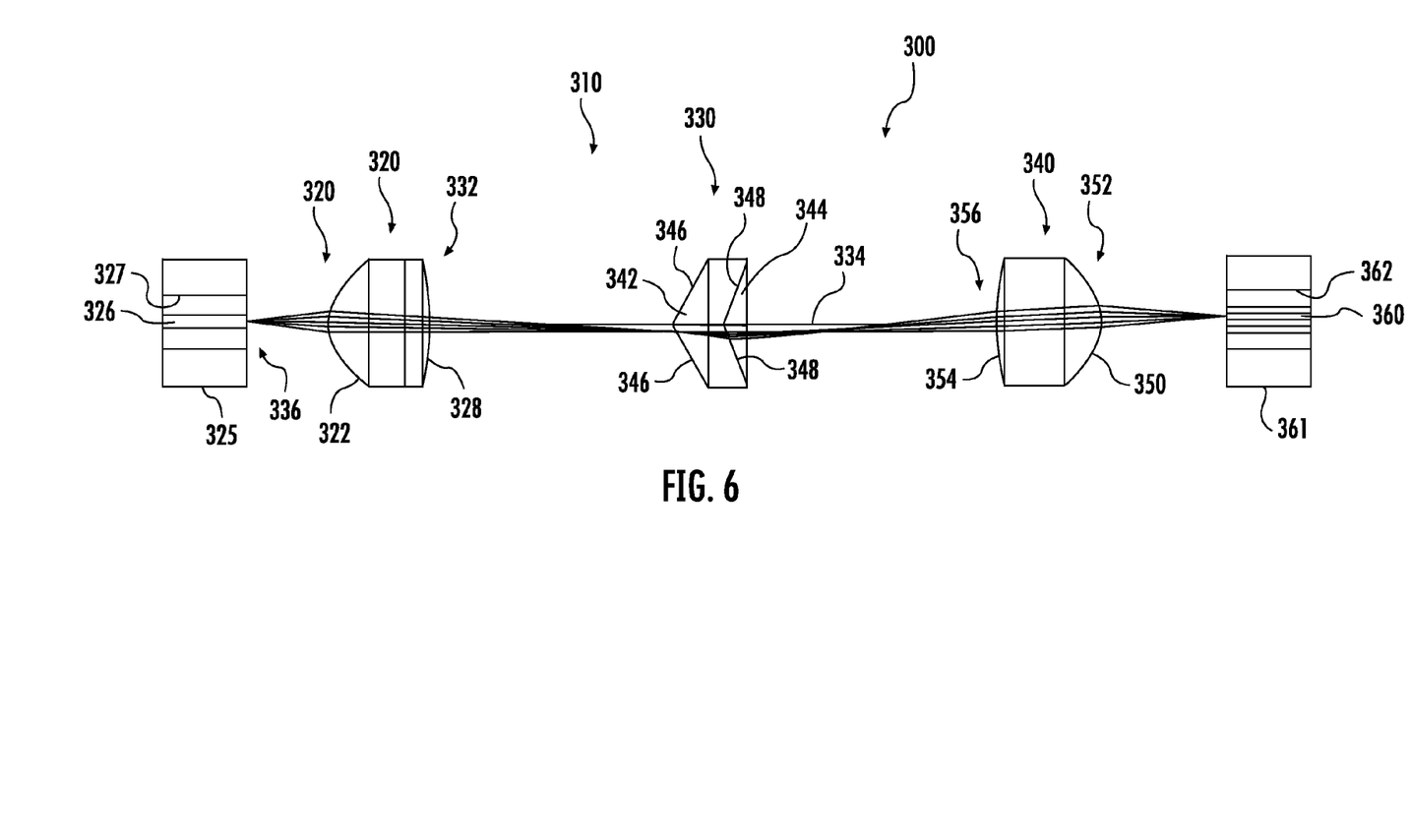
FIG. 6 is a schematic view of an alternative embodiment of an optical coupling system as described herein.

Referring now to FIG. 6, an alternative embodiment of an optical coupling system 300 is illustrated. In this embodiment, a furcation lens assembly 310 includes a collecting lens element 320, an axicon element 330, and a dispersing lens element 340. Each of the collecting, axicon, and dispersing lens elements 320, 330, 340 may be rotationally invariant relative to an optical axis 140 of the optical coupling system 300. Because the lens elements may be rotationally invariant, alignment of the lens elements 320, 330, 340 may be less time consuming than other optical coupling systems.

The collecting lens element 320 includes a magnifying aspheric surface 322 on an end 324 positioned near a multi-core optical fiber 326, and a standard flat or slightly convex or concave surface 328 positioned on an opposite end 332. The collecting lens element 320 may be positioned along an optical axis 334 in between the multi-core optical fiber 326 and the axicon element 330. The collecting lens element 320 is configured to project a magnified image of a fiber core 336 of the multi-core optical fiber 326 onto the axicon element 330. The axicon element 330 may be positioned proximate to the collecting lens element 320 and in between the collecting lens element 320 and the dispersing lens element 340. The axicon element 330 may include a furcating axicon surface 342 and a projecting axicon surface 344. The furcating axicon surface 342 includes a furcation slope component 346 and the projecting axicon surface 344 includes a telecentric slope component 348. In this embodiment, the furcation slope component 346 is configured to spatially separate optical modes of the multi-core optical fiber 326 to be substantially equal to the spatial separation of the optical modes of a single-mode optical fiber 360, as discussed above. The telecentric slope component 348 is configured to maintain the mode size of the optical mode of the multi-core optical fiber 326 and to map the optical mode of the multi-core optical fiber 326 to a corresponding optical mode 358 of the single-mode optical fiber 360, as discussed above. The dispersing lens element 340 comprises a demagnifying aspheric surface 350 configured to demagnify the image of the optical mode of the multi-core optical fiber 326 magnified by the magnifying aspheric surface 322. The demagnifying aspheric surface 350 may be positioned at an end 352 near the single-mode optical fiber 360. The dispersing lens element 340 may also comprise a standard flat or slightly convex or concave surface 354 at an opposite end 356 of the dispersing lens element 340.

In the three lens element 320, 330, 340 embodiment of the optical coupling system 300 illustrated in FIG. 6, there are a total of six surfaces 322, 328, 342, 344, 354, 350 through which the optical mode will propagate, which may lead to increased reflective loss when compared to a two lens element embodiment of the optical coupling system (illustrated in FIG. 1) having a total of only four surfaces through which the optical mode will propagate. However, the additional surfaces may allow additional degrees of freedom for the optical coupling system 300, which may allow for optimization of the optical coupling system 300 design and may reduce coupling loss.

Various embodiments will be further clarified by the following examples.

Example 1

In an experiment performed using the optical coupling system 100 depicted in FIG. 1 with a multi-core optical fiber with a fiber core having a diameter of about 10 µm and a spatial separation of about $r_1$ 53 µm and about $r_2$ 85 µm, and a single-mode optical fiber 122 having a diameter of about 10 µm and a spatial separation of about $r_1$ 142 µm and about $r_2$ 229 µm. The initial mode field diameter was approximately 10 um. In this example, the location of the array of single-mode fiber cores is approximately a 2.7× magnification of the cores of the multi-core optical fiber. In order to realize efficient coupling, the magnification of the individual cores may need to be unity. In this example, the output face of the multi-core optical fiber is the object plane in FIG. 1, while the input face of the single-mode optical fiber is the image plane. Accordingly, the optical coupling system magnified the fiber cores of the multi-core optical fiber by about 4.5× to match the spatial separation of the fiber cores of the single-mode optical fiber. The image was then demagnified by the demagnifying aspheric surface to ensure the overall magnification of the system was in unity.

The results of the optical coupling system in the experiment indicated that the size of the mode field was increased by approximately 10%. This increase in mode field diameter implies a very low level of coupling loss, such as less than 0.1 dB. Another measurement obtained was the root-mean-square (rms) wavefront error of the optical mode at the image plane. For both the inner and outer cores the rms wavefront error is less than 1/75 for propagating optical signals between approximately 400 nm and approximately 1600 nm. Additionally, a change in mode field was measured to be less than or equal to approximately 10%, and in some instances, a change in mode field of less than or equal to approximately 5% was measured.

The above-described disclosure may provide effective optical coupling between optical fibers having different spatial separation and arrangements. Because the optical coupling system and apparatus described herein is rotationally invariant, precise alignment and/or specific azimuthal orientation may not be needed, which may result in reduced time and increased ease of installation and manufacturability. Additionally, mode field and mode size may remain substantially unchanged and telecentric, and coupling loss may be minimal, resulting in effective optical coupling.

For the purposes of describing and defining the present invention it is noted that the terms "substantially," "approximately," and "about" are utilized herein to represent the inherent degree of uncertainty that may be attributed to any quantitative comparison, value, measurement, or other representation. The terms are also utilized herein to represent the degree by which a quantitative representation may vary from a stated reference without resulting in a change in the basic function of the subject matter at issue.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical coupling device comprising a multi-core fiber alignment station, a single-mode fiber alignment station, and a furcation lens assembly, wherein:
    the multi-core fiber alignment station comprises multi-core fiber alignment hardware configured to position a multi-core optical fiber at a fixed position relative to an optical axis of the furcation lens assembly;
    the single-mode fiber alignment station comprises single-mode fiber alignment hardware configured to position single-mode optical fibers at fixed positions relative to the optical axis of the furcation lens assembly;
    the furcation lens assembly comprises a magnifying aspheric surface, a demagnifying aspheric surface, a furcating axicon surface, and a projecting axicon surface;
    the aspheric and axicon surfaces of the furcation lens assembly are positioned along the optical axis such that
        the magnifying aspheric surface is positioned between the multi-core fiber alignment station and the furcating axicon surface,
        the furcating axicon surface is positioned between the magnifying aspheric surface and the projecting axicon surface,
        the projecting axicon surface is positioned between the furcating axicon surface and the demagnifying aspheric surface, and
        the demagnifying aspheric surface is positioned between the projecting axicon surface and the single-mode fiber alignment station;
    the furcating axicon surface comprises at least one furcation slope component configured to spatially separate, relative to the optical axis of the furcation lens assembly, optical modes of a multi-core optical fiber aligned in the multi-core fiber alignment station;
    the projecting axicon surface comprises at least one telecentric slope component configured to ensure that optical modes of a multi-core optical fiber aligned in the multi-core fiber alignment station are substantially telecentric when focused at respective input faces of single-mode optical fibers aligned in the single-mode fiber alignment station;

the furcating and projecting axicon surfaces are rotationally invariant relative to the optical axis of the furcation lens assembly; and the aspheric and axicon surfaces of the furcation lens assembly are configured such that optical modes of a multi-core optical fiber aligned in the multi-core fiber alignment station are spatially separated and substantially telecentrically mapped to corresponding optical modes of furcated single-mode optical fibers aligned in the single-mode fiber alignment station.

2. The optical coupling device of claim 1, wherein the furcating axicon surface comprises n furcation slope components and the projecting axicon surface comprises n telecentric slope components, where n>0.

3. The optical coupling device of claim 2, wherein n=2.

4. The optical coupling device of claim 2, wherein n>2.

5. The optical coupling device of claim 1, wherein:
the projecting axicon surface comprises at least two telecentric slope components;
the furcating axicon surface comprises at least two furcation slope components;
one of the two furcation slope components is orthogonal to the optical axis; and
one of the two telecentric slope components is orthogonal to the optical axis.

6. The optical coupling device of claim 1, wherein the spatial separation ($r_2-r_1$) of the optical modes at a single-mode fiber input plane defined by the single-mode fiber alignment station is at least approximately 50 μm.

7. The optical coupling device of claim 1, wherein the spatial separation ($r_2-r_1$) of the optical modes at a single-mode fiber input plane defined by the single-mode fiber alignment station is between approximately 30 μm and approximately 100 μm.

8. The optical coupling device of claim 1, wherein the spatial separation ($r_2-r_1$) of the optical modes at a single-mode fiber input plane defined by the single-mode fiber alignment station is at least 25 μm greater than the spatial separation ($r_2-r_1$) of the optical modes at a multi-core fiber output plane defined by the multi-core fiber alignment station.

9. The optical coupling device of claim 1, wherein the aspheric and axicon surfaces have fixed positions relative to each other along the optical axis.

10. The optical coupling device of claim 1, wherein the aspheric and axicon surfaces are movable relative to each other along the optical axis.

11. The optical coupling device of claim 1, wherein:
the furcation lens assembly further comprises a collecting lens element and a dispersing lens element;
the magnifying aspheric surface and the furcating axicon surface are positioned at either end of the collecting lens element along the optical axis; and
the projecting axicon surface and the demagnifying aspheric surface are positioned at either end of the dispersing lens element along the optical axis.

12. The optical coupling device of claim 1, wherein:
the furcation lens assembly further comprises a collecting lens element, an axicon lens element, and a dispersing lens element;
the magnifying aspheric surface is positioned along the optical axis at an end of the collecting lens element proximate to a multi-core optical fiber positioned in the multi-core fiber alignment station;
the furcating axicon surface and the projecting axicon surface are positioned at either end of the axicon lens element along the optical axis; and
the demagnifying aspheric surface is positioned along the optical axis at an end of the dispersing lens element proximate to a single-mode optical fiber positioned in the single-mode fiber alignment station.

13. The optical coupling device of claim 1, wherein the optical coupling device is structurally configured to impart an optical coupling loss less than or equal to approximately 0.1 dB for propagating optical signals between approximately 400 nm and approximately 1600 nm.

14. The optical coupling device of claim 1, wherein the optical coupling device is structurally configured to impart a change in mode field of less than or equal to approximately 10% for propagating optical modes between approximately 400 nm and approximately 1600 nm.

15. The optical coupling device of claim 1, wherein the optical coupling device is structurally configured to impart a change in mode field of less than or equal to approximately 5% for propagating optical modes between approximately 400 nm and approximately 1600 nm.

16. The optical coupling device of claim 1, wherein the optical coupling device is structurally configured to impart a change in mode field of less than or equal to approximately 1% for propagating optical modes between approximately 400 nm and approximately 1600 nm.

17. The optical coupling device of claim 1, wherein the optical coupling device is structurally configured to impart a root mean square wavefront error of less than or equal to about $\lambda/5$, where $\lambda$ is a wavelength of the optical mode of the multi-core optical fiber and is between approximately 400 nm and approximately 1600 nm.

18. An optical coupling system comprising an optical coupling device, a multi-core optical fiber, and a plurality of single-mode optical fibers, wherein:
the optical coupling device comprises a multi-core fiber alignment station, a single-mode fiber alignment station, and a furcation lens assembly;
the multi-core optical fiber is positioned in the multi-core fiber alignment station at a fixed position relative to an optical axis of the furcation lens assembly;
the plurality of single-mode optical fibers are positioned in the single-mode fiber alignment station at fixed positions relative to the optical axis of the furcation lens assembly;
the furcation lens assembly comprises a magnifying aspheric surface, a demagnifying aspheric surface, a furcating axicon surface, and a projecting axicon surface;
the aspheric and axicon surfaces of the furcation lens assembly are positioned along the optical axis such that the magnifying aspheric surface is positioned between the multi-core fiber alignment station and the furcating axicon surface, the furcating axicon surface is positioned between the magnifying aspheric surface and the projecting axicon surface, the projecting axicon surface is positioned between the furcating axicon surface and the demagnifying aspheric surface, and the demagnifying aspheric surface is positioned between the projecting axicon surface and the single-mode fiber alignment station;
the furcating axicon surface comprises at least one furcation slope component configured to spatially separate, relative to the optical axis of the furcation lens assembly, optical modes of the multi-core optical fiber aligned in the multi-core fiber alignment station;

the projecting axicon surface comprises at least one telecentric slope component configured to ensure that optical modes of the multi-core optical fiber aligned in the multi-core fiber alignment station are substantially telecentric when focused at respective input faces of the plurality of single-mode optical fibers aligned in the single-mode fiber alignment station;

the furcating and projecting axicon surfaces are rotationally invariant relative to the optical axis of the furcation lens assembly; and the aspheric and axicon surfaces of the furcation lens assembly are configured such that the optical modes of the multi-core optical fiber aligned in the multi-core fiber alignment station are spatially separated and substantially telecentrically mapped to corresponding optical modes of furcated single-mode optical fibers aligned in the single-mode fiber alignment station.

19. The optical coupling system of claim 18, wherein:

the multi-core optical fiber comprises a plurality of optical cores disposed at n radial distances from a longitudinal axis of the multi-core optical fiber at the multi-core fiber alignment station, where n>0;

the furcating axicon surface comprises n furcation slope components; and the projecting axicon surface comprises n telecentric slope components.

20. The optical coupling system of claim 19, wherein the longitudinal axis is at the center of the multi-core optical fiber at the multi-core fiber alignment station.

21. The optical coupling system of claim 19, wherein the plurality of single-mode optical fibers are disposed at n radial distances from a common fiber axis at the single-mode fiber alignment station.

22. The optical coupling system of claim 19, wherein n=2.

23. The optical coupling system of claim 19, wherein n>2.

* * * * *